United States Patent
Humble

(10) Patent No.: US 10,189,682 B1
(45) Date of Patent: Jan. 29, 2019

(54) RESCUE HOOK WITH INTEGRATED LIGHTING

(71) Applicant: Goodrich Corporation, Charlotte, NC (US)

(72) Inventor: Robert Humble, Brea, CA (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 15/648,714

(22) Filed: Jul. 13, 2017

(51) Int. Cl.
| | |
|---|---|
| F21V 7/10 | (2006.01) |
| B66C 1/40 | (2006.01) |
| A62B 35/04 | (2006.01) |
| F16F 1/371 | (2006.01) |
| A62B 1/18 | (2006.01) |
| F21V 33/00 | (2006.01) |
| F21V 23/00 | (2015.01) |
| F21V 23/04 | (2006.01) |
| B66C 1/36 | (2006.01) |
| F21Y 115/20 | (2016.01) |
| F21Y 107/20 | (2016.01) |

(52) U.S. Cl.
CPC ........... B66C 1/40 (2013.01); A62B 1/18 (2013.01); A62B 35/04 (2013.01); F16F 1/371 (2013.01); F21V 23/003 (2013.01); F21V 23/04 (2013.01); F21V 23/0464 (2013.01); F21V 23/0471 (2013.01); F21V 33/0064 (2013.01); B66C 1/36 (2013.01); F16F 2230/0047 (2013.01); F21Y 2107/20 (2016.08); F21Y 2115/20 (2016.08)

(58) Field of Classification Search
None
See application file for complete search history.

(56) References Cited

U.S. PATENT DOCUMENTS 3,250,563 A * 5/1966 Walsh ............... B66C 1/34
  294/82.16
2011/0001437 A1    1/2011 Marcaccio et al.

FOREIGN PATENT DOCUMENTS

| CN | 205419619 U | 8/2016 |
|---|---|---|
| JP | 2007030794 A | 2/2007 |

* cited by examiner

Primary Examiner — Ashok Patel
(74) Attorney, Agent, or Firm — Kinney & Lange, P.A.

(57) ABSTRACT

A hook assembly can include a bumper assembly and a hook attached to the bumper. The bumper assembly includes a top plate, a bottom plate, and a bumper extending between and connecting the top plate and the bottom plate. A lighting element can be disposed on the top plate, the bottom plate, and the bumper to provide a visual indicator for the bumper assembly. The lighting element can be an electroluminescent device, and can be disposed on an exterior surface of the bumper assembly or in a recess extending into the bumper assembly. A power source and other electrical components can be stored in a compartment in the top plate.

19 Claims, 6 Drawing Sheets

RESCUE HOOK WITH INTEGRATED LIGHTING

BACKGROUND

This disclosure relates generally to rescue hoists. More particularly, this disclosure relates to lighting on rescue hoist hook assemblies.

Rescue hoists deploy and retrieve a cable to hoist persons or cargo. A hook assembly is disposed at a distal end of the cable to connect the persons or cargo to the cable. The hook assembly includes a bumper and a hook element connected to the bumper. The bumper spaces the hook element from the rescue hoist when the hook assembly is homed and can enclose the connection between the hook element and the cable. During nighttime operation and other low-visibility operating conditions the hook assembly is difficult to visually locate. To provide improved visibility, the hook assembly can be temporarily lighted, such as by a chemical glow stick, which limits use of the hook assembly for other purposes and provides only short-term lighting. The hook assembly can also be retrofitted with an auxiliary lighting assembly that can be attached to a bumper, which adds size, bulk, and weight to the hook assembly.

SUMMARY

According to one aspect of the disclosure, a bumper assembly for a rescue hoist includes a bumper having a barrel extending between a top end and a bottom end, a first lighting element disposed on the bumper and configured to emit light in response to a current from a power source, and a top plate disposed on the top end, the top plate defining a compartment configured to house the power source.

According to another aspect of the disclosure, a hook assembly for a rescue hoist includes a bumper assembly and a hook. The bumper assembly includes a bumper having a barrel extending between a top end and a bottom end and a first recess extending helically around the barrel, a first lighting element disposed in the first recess, a top plate attached to the top end of the bumper and defining compartment, a bottom plate attached to the bottom end of the bumper, and a power source disposed within the compartment, the power source configured to provide power to the first lighting element. The hook extends from the bottom plate.

DETAILED DESCRIPTION

Figure 1A:
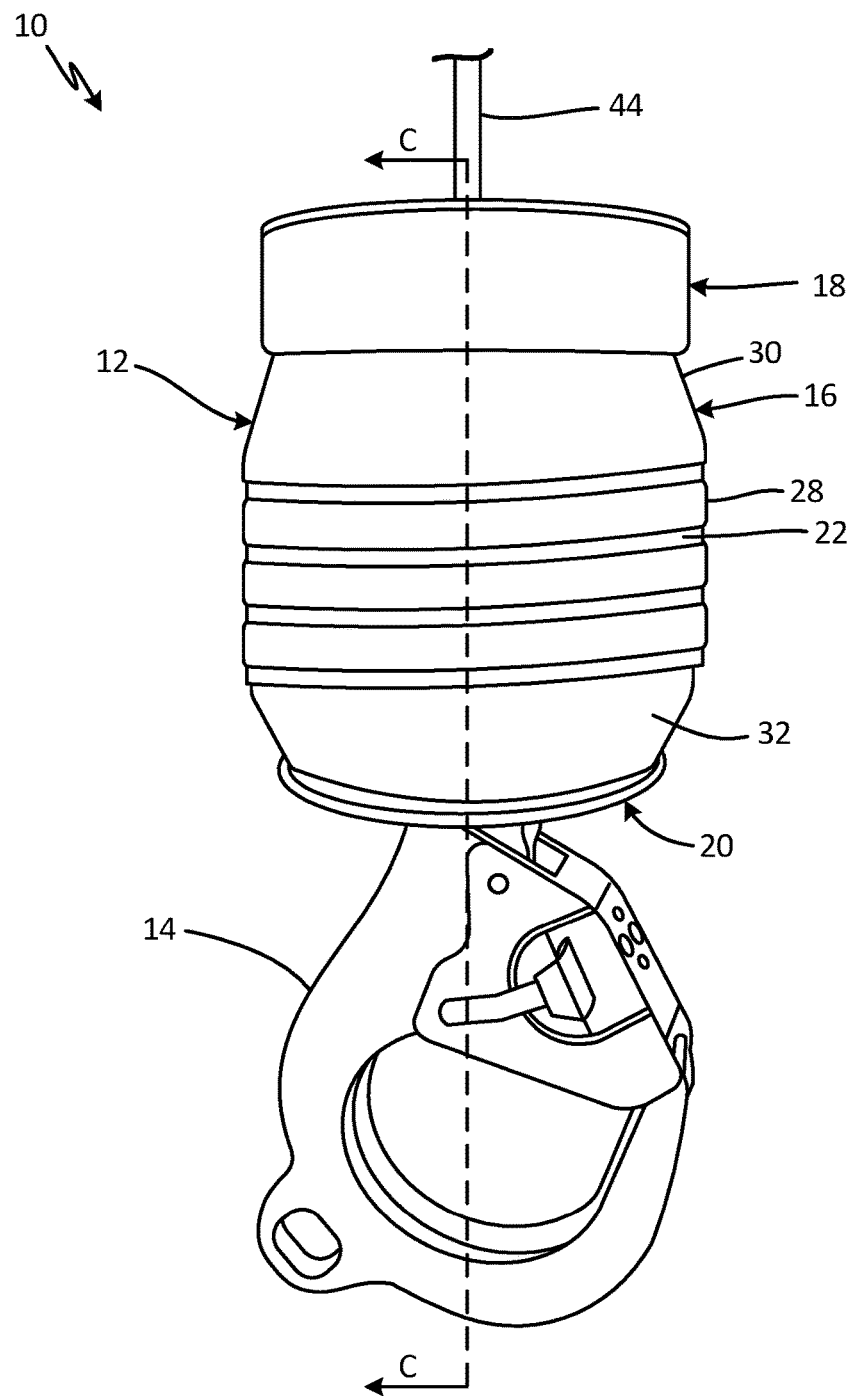
FIG. 1A is a perspective view of a hook assembly.
Figure 1B:
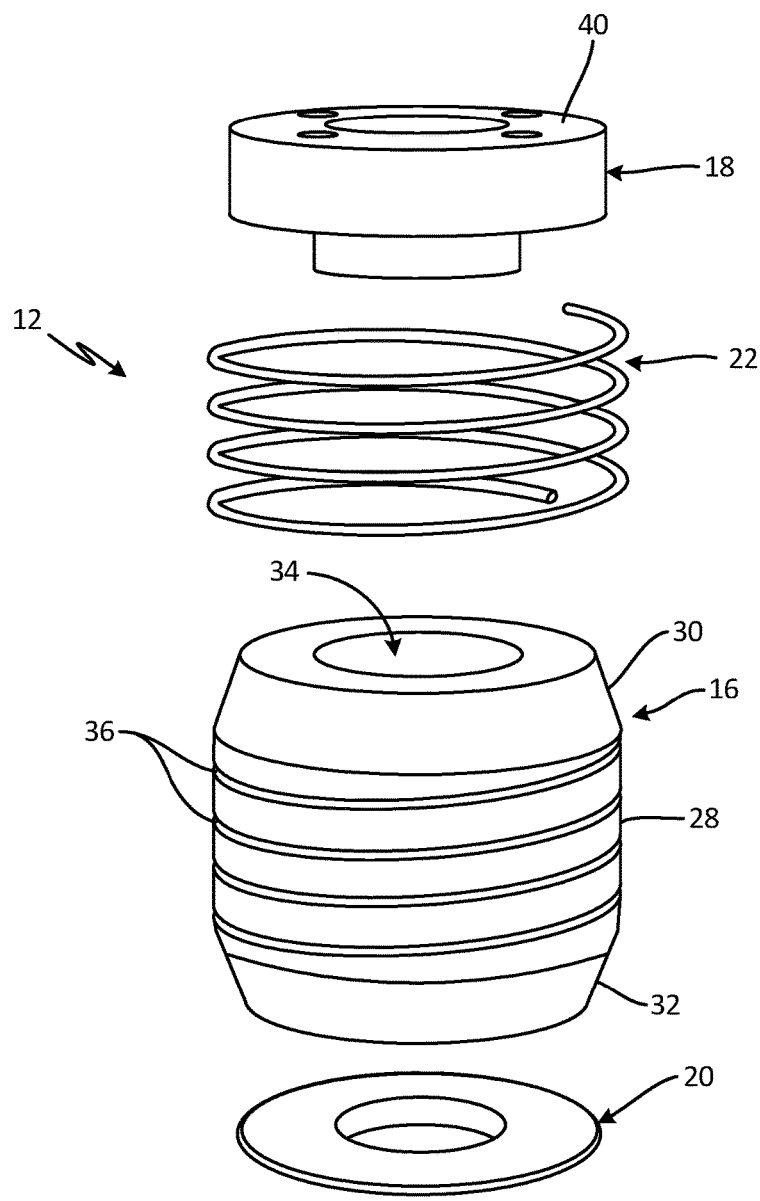
FIG. 1B is an exploded view of a bumper assembly.
Figure 1C:
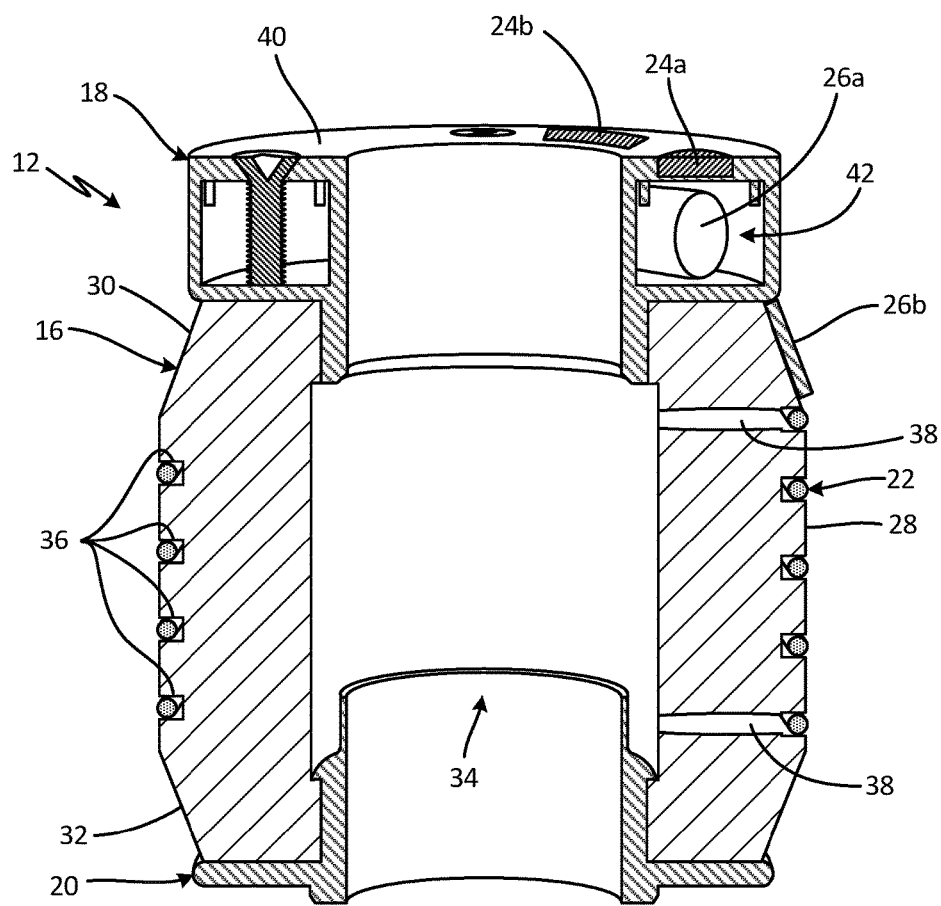
FIG. 1C is a cross-sectional view of the bumper assembly of FIG. 1A taken along line C-C in FIG. 1A.

FIG. 1A is a perspective view of hook assembly 10. FIG. 1B is an exploded view of bumper assembly 12. FIG. 1C is a cross-sectional view of bumper assembly 12 taken along line C-C in FIG. 1A. FIGS. 1A-1C will be discussed together. Hook assembly 10 includes bumper assembly 12 and hook 14. Bumper assembly 12 includes bumper 16, top plate 18, bottom plate 20, lighting element 22, control element 24a and 24b, and power source 26a and 26b.

Bumper 16 includes barrel 28, top end 30, bottom end 32, and central bore 34. Barrel 28 includes recess 36 and through-holes 38. Top plate 18 includes cover 40 and compartment 42. Cable 44 extends through bumper 16 and connects to hook 14, thereby connecting hook assembly 10 to a rescue hoist.

Bumper 16 extends between top plate 18 and bottom plate 20. Bumper 16 can become compressed during operation, and as such, bumper 16 is a robust, compressible material, such as an elastomeric material. Central bore 34 extends through bumper 16 and provides a pathway for cable 44. Recess 36 extends helically around barrel 28. Lighting element 22 is disposed within recess 36. It is understood, however, that barrel 28 can included a plurality of recesses with individual lighting elements 22 disposed in each recess. For example, recess 36 can include discrete rings stacked on barrel 28, and lighting element 22 can include multiple discrete rings of lighting elements disposed in the discrete recesses. It is further understood, that recess 36 can extend into barrel 28, top end 30, bottom end 32, and any combination thereof.

Recess 36 is configured to house lighting element 22 during operation of hook assembly 10. In some examples, a depth of recess 36 is proximate a diameter of lighting element 22. As such, recess 36 can prevent lighting element 22 from projecting from bumper 16 where lighting element 22 could be exposed to damage from an outside object. In some examples, recess 36 can be sized to offset the weight of lighting element 22, thereby minimizing or eliminating any weight gain due to lighting element 22. Recess 36 can thus offset both the volume and weight of lighting element 22 such that bumper 16 has little to no weight or volumetric increase due to lighting element 22. Through-holes 38 extend through barrel 28 and into recess 36. In some examples, through-holes extend into recess 36 proximate terminal ends of recess 36. Through-holes 38 provide a path for lighting element 22 or wires to extend through to provide power to lighting element 22 from power source 26. It is understood that recess 36 can be applied to bumper 16 in any desired manner. For example, recess 36 can be integrally formed with bumper 16, such as by molding, or can be formed using a post-production process, such as milling or drilling.

Lighting element 22 can be disposed within recess 36 such that lighting element 22 wraps helically around bumper 16. Lighting element 22 is configured to provide illumination to hook assembly 10 such that a user can visually locate hook assembly 10. In some examples, lighting element 22 can be electroluminescent, such as an electroluminescent wire, sheet, and/or tape, configured to emit light in response to a current being applied. In some examples, lighting element 22 can be one or more of an electroluminescent wire, an electroluminescent sheet, a strand of light-emitting diodes (LED), individual LEDs, an LED tape, incandescent bulbs, or any other element configured to emit light in response to a current. Lighting element 22 can further include a backing material, such as an adhesive, configured to retain lighting element 22 in a desired location. It is further understood that lighting element 22 can emit light in the visible spectrum, infrared spectrum, ultraviolet spectrum, or any combination thereof. Moreover, lighting element 22 can be configured to emit light at varying intensities. For example, lighting element 22 can include an electroluminescent wire and infrared-emitting LEDs.

Top plate 18 is disposed on top end 30 of bumper 16. It is understood that top plate 18 can be integrally formed with bumper 16 or can be separately formed. Top plate 18 is sufficiently robust such that top plate 18 can endure repeatedly striking the rescue hoist and can provide protection to the electronic components stored within top plate 18. In some examples, top plate 18 is a corrosion resistant steel.

Top plate 18 defines compartment 42. Cover 40 encloses compartment 42 and can be removable from top plate 18 to allow access to compartment 42. Power source 26 and other electrical components of hook assembly 10 can be housed in compartment 42. For example, power source 26 can include a battery pack and a circuit card. In one example, the battery pack can be configured to produce a direct current, and the circuit card can be configured to provide a desired alternating current to power lighting element 22 from the direct current. It is understood, however, that power source 26 can be configured to provide power to lighting element 22 in any desired manner. In some examples, power source 26 can include a battery, such as a rechargeable battery, a solar cell, and any combination thereof. For example, power source 26a can include a rechargeable battery and power source 26b can include a photocell, such as a solar cell, such that the photocell recharges the rechargeable battery.

Control element 24 can be disposed in and/or on top plate 18, bumper 16, bottom plate 20, or any combination thereof. Control element 24 can control the activation of lighting element 22. In some examples, control element 24 can control the activation of lighting element 22 based on a user manually activating lighting element 22, hook assembly 10 displacing from the rescue hoist or environmental conditions, such as the amount of ambient light, among others. In one example, control element 24 is a contact switch or proximity sensor that cuts power to lighting element 22 when top plate 18 contacts the rescue hoist, thereby indicating that hook assembly 10 is in the homed position. Lighting element 22 can then emit light when control element 24 is not in contact with the rescue hoist, such that hook assembly 10 is displaced from the rescue hoist and in operation. In a further example, control element 24 can be a photocell configured to control lighting element 22 based on a level of ambient light. While control element 24 is described as a manual switch, contact switch, and/or photocell, it is understood that control element 24 can be of any suitable configuration for controlling the activation of lighting element 22, and bumper 16 can include any desired number and combination of control elements 24. In one example, control element 24a is a switch and control element 24b is a photocell, such that control elements 24a and 24b work in conjunction to control power to lighting element 22 based on both the level of ambient light and the position of hook assembly 10 relative to the rescue hoist. In a further example, control element 24a is a sensor, such as a proximity sensor, and control element 24b is a photocell. While bumper assembly 12 is described as including control element 24a and control element 24b, it is understood that bumper assembly 12 can include as few or as many control elements 24 as desired.

Bottom plate 20 is disposed on bottom end 32 of bumper 16. Bottom plate 20 can be integrally formed with bumper 16 or can be separately formed. Bottom plate 20 can attach, directly or indirectly, such as through an intermediate bearing, to hook 14, thereby securing hook 14 to bumper 16.

During operation, hook assembly 10 is connected to persons or objects to raise or lower the persons or objects from a rescue hoist. Hook assembly 10 is initially in a homed position, with top plate 18 abutting the rescue hoist. With hook assembly 10 in the homed position, bumper 16 is compressed between top plate 18 and bottom plate 20. Lighting element 22 is sufficiently flexible such that lighting element 22 can compress within recess 36 concurrently with bumper 16. Power source 26 provides power for lighting element 22 and lighting element 22 emits light upon receipt of the power. Control element 24 controls the power provided to lighting element 22 by power source 26. When control element 24 is switched to an on position, power from power source 26 is received by lighting element 22, and lighting element 22 emits light in response to the power received from power source 26. The light emitted by lighting element 22 can provide a visual indicator of the location of hook assembly 10 to aid in hoist operations.

Bumper 16 provides significant advantages. Lighting element 22 provides a lighting source for hook assembly 10 with minimal to no increase in the weight or volume of bumper 16. Lighting element 22 provides a visual indicator of the location of hook assembly 10. Recess 36 receives lighting element 22 and protects lighting element 22 from impact damage. Moreover, top plate 18 can house the power source for illuminating lighting element 22. Enclosing the power source within top plate 18 eliminates additional elements that would be required to house the power source, thereby providing a simpler, lighter hook assembly 10. Integrating both the power source and lighting element 22 into bumper 16 provides an increased operating life for bumper 16.

Figure 2:
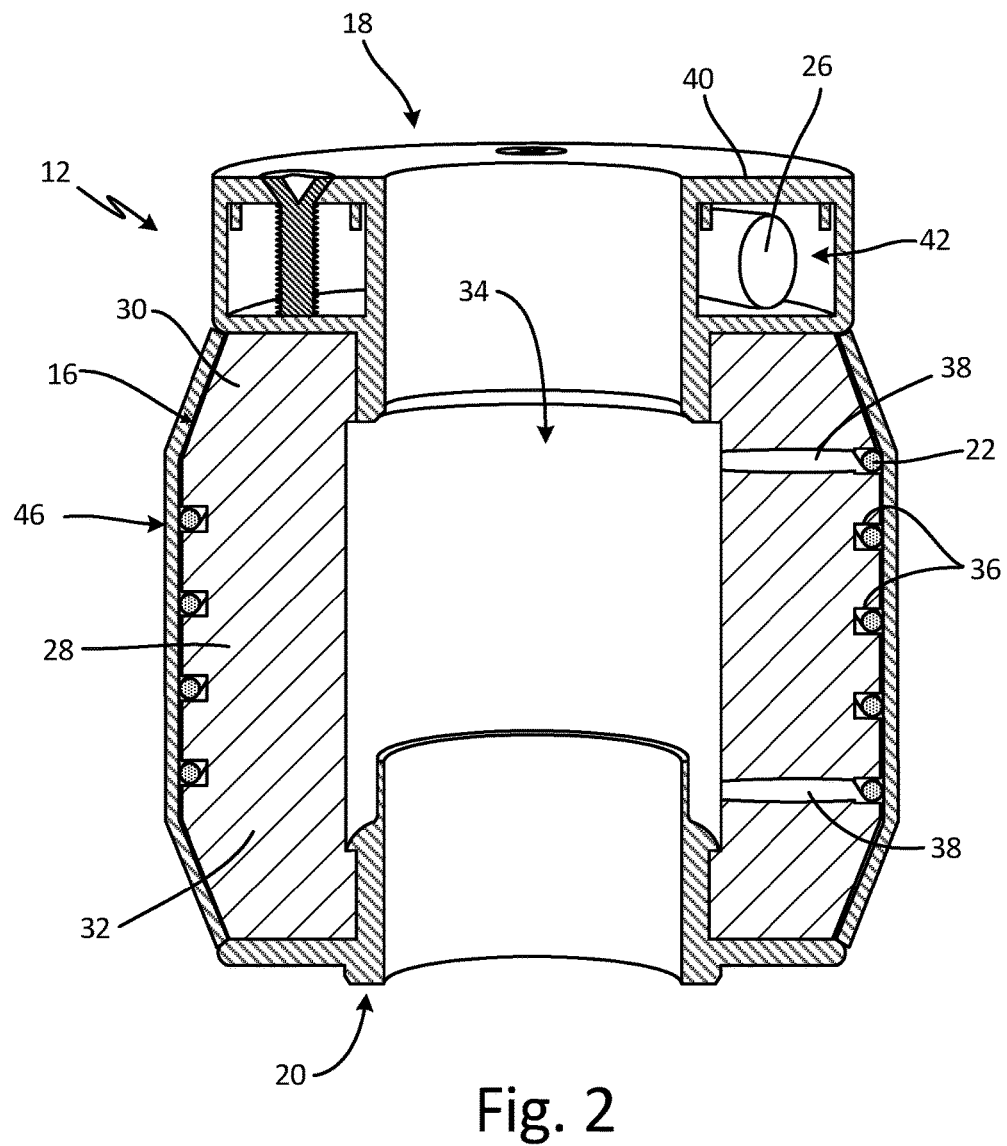
FIG. 2 is a cross-sectional view of a bumper assembly.

FIG. 2 is a cross-sectional view of bumper assembly 12. Bumper assembly 12 includes bumper 16, top plate 18, bottom plate 20, lighting element 22, control element 24 (shown in FIG. 1C), power source 26, and protective layer 46. Bumper 16 includes barrel 28, top end 30, bottom end 32, and central bore 34. Barrel 28 includes recess 36 and through-holes 38. Top plate 18 includes cover 40 and compartment 42.

Bumper 16 is disposed between and attached to top plate 18 and bottom plate 20. Barrel 28 extends between top end 30 and bottom end 32. Recess 36 extends helically around barrel 28, and lighting element 22 is disposed within recess 36. In some examples, lighting element 22 can be an electroluminescent wire. Recess 36 can house lighting element 22 during operation, and can be sized to prevent lighting element 22 from protruding beyond an outer surface of barrel 28 and to offset the weight of lighting element 22. As such, recess 36 can protect lighting element 22 from impact damage where bumper 16 strikes an object during operation. While lighting element 22 can be an electroluminescent wire, it is understood that lighting element 22 can be of any suitable configuration for emitting light in response to a signal, such as an electroluminescent sheet or tape, or individual electroluminescent elements. For example, lighting element 22 can include a plurality of LEDs or incandescent bulbs extending around bumper 16. In some examples, recess 36 can include a plurality of spaced indents configured to house one or more of the individual lighting elements 22, such as the LEDs or incandescent bulbs.

Protective layer 46 is disposed on an outer surface of bumper 16. Protective layer 46 extends around bumper 16 over lighting element 22 to enclose and protect lighting element 22. In some examples, protective layer 46 can be integral with bumper 16. For example, protective layer 46 can be an overmolded encapsulation on bumper 16 with lighting element 22 arranged in recess 36, such that bumper 16 and protective layer 46 enclose lighting element 22 within recess 36. In some examples, protective layer 46 can be removably attached to bumper 16, such where protective layer 46 is a sheath, a hard casing, or any other suitably protective element. For example, protective layer 46 can be a flexible sheath, such as a polyurethane sheath, that can be rolled over bumper 16 to enclose lighting element 22 in recess 36. In another example, protective layer 46 can be a hinged case shaped to encase bumper 16, thereby enclosing lighting element 22 in recess 36. Protective layer 46 allows light emitted by lighting element 22 to travel though protective layer 46, and as such, protective layer 46 can be transparent or translucent.

Bumper assembly 12 provides significant advantages. Lighting elements 22 provide a lightweight, integral source of light to provide an indicator of the location of bumper 16. Protective layer 46 encloses lighting element 22 to protect lighting element 22 from damage, while allowing the light emitted by lighting element 22 to pass through protective layer 46. As such, protective layer 46 provides lightweight, robust protection for lighting element 22.

Figure 3:
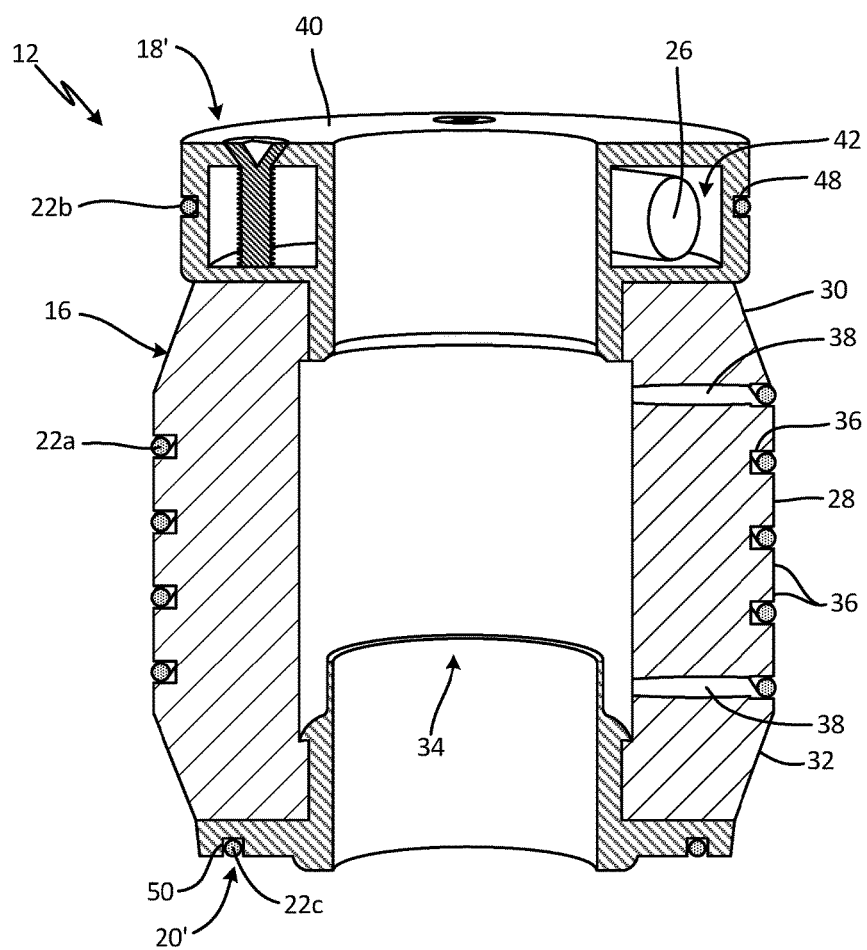
FIG. 3 is a cross-sectional view of a bumper assembly.

FIG. 3 is a cross-sectional view of bumper assembly 12. Bumper assembly 12 includes bumper 16, top plate 18', bottom plate 20', lighting elements 22a, 22b, and 22c, control element 24 (shown in FIG. 1C), and power source 26. Bumper 16 includes barrel 28, top end 30, bottom end 32, and central bore 34. Barrel 28 includes recess 36 and through-holes 38. Top plate 18' includes cover 40, compartment 42, and recess 48. Bottom plate 20' includes recess 50.

Bumper 16 is disposed between and attached to top plate 18' and bottom plate 20'. Barrel 28 extends between top end 30 and bottom end 32. Recess 36 extends around barrel 28, and lighting element 22a is disposed within recess 36. In some examples, lighting element 22a can be an electroluminescent wire, sheet, and/or tape. Lighting element 22a can further include a backing material, such as an adhesive, to secure lighting element 22a to bumper 16. Recess 36 can house lighting element 22 during operation, and can be sized to prevent lighting element 22 from projecting beyond an outer surface of barrel 28. Through-holes 38 extend through bumper 16 into recess 36. Through-holes 38 can provide a pathway to connect power source 26 and lighting element 22a. For example, wires can extend from power source 26 and to lighting element 22a through through-holes 38. In another example, lighting element 22a can extend through through-holes 38 to connect to power source 26.

Top plate 18' is disposed on top end 30 of bumper 16. While top end 30 is shown as tapered, it is understood that top end 30 can be of any desired configuration. Top plate 18' defines compartment 42. Cover 40 encloses compartment 42 and can be removable from top plate 18' to allow access to compartment 42. Power source 26 and other electrical components associated with lighting elements 22a-22c can be stored in compartment 42. Power source 26 can include one or more power elements to provide power to lighting elements 22a-22c. In one example, power source 26 can include a single power element common to all lighting elements 22a-22c. In other examples, power source 26 can include multiple power sources each configured to provide power to one or more of respective lighting elements 22a-22c. Control element 24 can be disposed in and/or on top plate 18', bumper 16, bottom plate 20', or any combination thereof. Control element 24 can control the activation of lighting element 22 based on a user manually activating lighting element 22, bumper 16 displacing from a rescue hoist, environmental conditions, such as the amount of ambient light, among others. For example, control element 24 can be a switch, such as a contact switch, or a sensor, such as a proximity sensor or a photocell.

Recess 48 extends around top plate 18'. Lighting element 22b is disposed in recess 48. Lighting element 22b is an electroluminescent configured to emit light in response to a current being applied to lighting element 22b. As shown, lighting element 22b can include an electroluminescent wire wrapped onto top plate 18', individual lighting elements, such as LED or incandescent bulbs, disposed in recess 48, an electroluminescent sheet, an electroluminescent tape, or any other suitable lighting element. For example, an electroluminescent sheet can be cut to fit within recess 48 and can be disposed within recess 48. Lighting element 22b can be disposed in recess 48 or can be wrapped onto an exterior surface of top plate 18'. Recess 48 can be sized to have a depth equal to or less than a diameter of lighting element 22b to provide impact protection to lighting element 22b. Top plate 18' can also include a protective layer, similar to protective layer 46 (shown in FIG. 2), to enclose and protect lighting element 22b. The protective layer can be integral with top plate 18' or removable from top plate 18'. Top plate 18' can also include through-holes, similar to through-holes 38, to provide a pathway between power source 26 and lighting element 22b.

Bottom plate 20' is disposed on bottom end 32 of bumper 16. While bottom end 32 is shown as tapered, it is understood that bottom end 32 can be of any desired configuration. Recess 50 extends around bottom plate 20'. Lighting element 22c is disposed in recess 50 on bottom plate 20', and is configured to emit light in response to a current being applied to lighting element 22c. Lighting element 22c can include an electroluminescent wire wrapped onto bottom plate 20', individual lighting elements, such as LED or incandescent bulbs, disposed in recess 50, an electroluminescent sheet, an electroluminescent tape, or any other suitable lighting element. For example, lighting element 22c can be an electroluminescent sheet cut to fit within recess 50. It is understood that lighting element 22c can be disposed in recess 50 or can be wrapped onto an exterior surface of bottom plate 20'. Recess 50 can be sized to have a depth equal to or less than a diameter of lighting element 22c to provide impact protection to lighting element 22c. Bottom plate 20' can also include a protective layer, similar to protective layer 46 (shown in FIG. 2), to enclose and protect lighting element 22c. The protective layer can be integral with bottom plate 20' or removable from bottom plate 20'. Bottom plate 20' can also include through-holes, similar to through-holes 38, to provide a pathway between power source 26 and lighting element 22c.

Bumper assembly 12 provides significant advantages. Lighting elements 22 provide a lightweight, integral source of light to provide an indicator of the location of bumper 16. Moreover, multiple lighting elements 22a-22c provide redundant light sources, to ensure that at least one source of identifying light is emitted from bumper assembly 12 even where one of the lighting elements 22a-22c is damaged or otherwise non-operational. In addition, recess 36, recess 48, and recess 50 protect lighting elements 22a-22c, respectively, from damage, such as impact damage.

Figure 4:
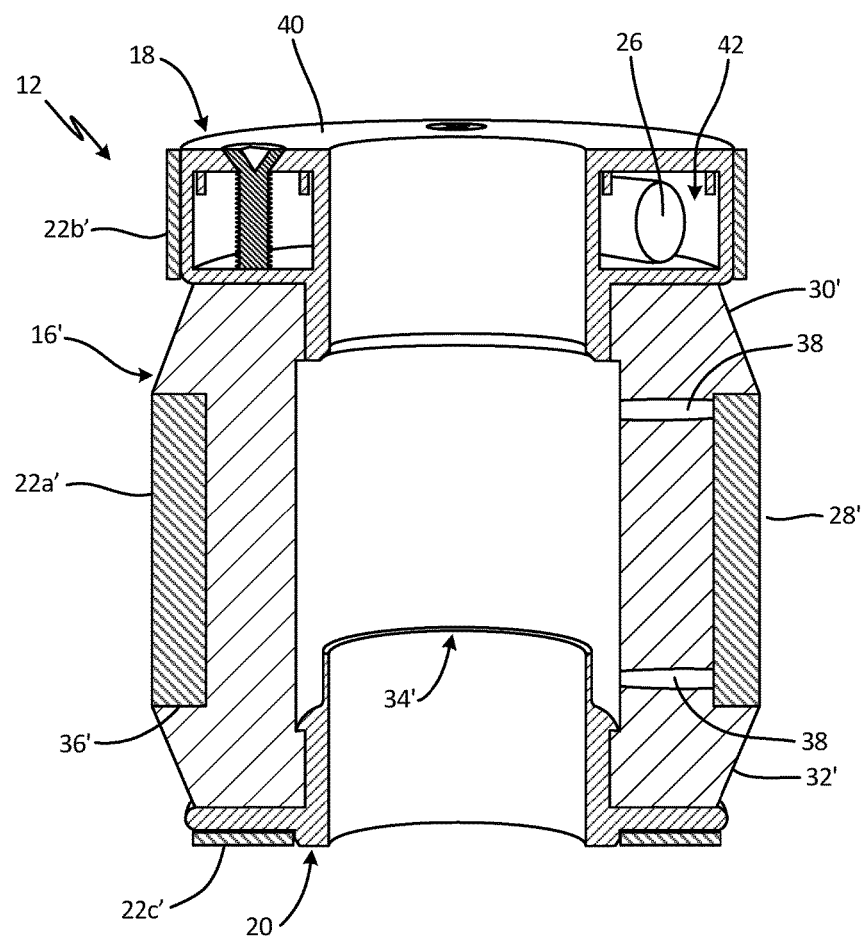
FIG. 4 is a cross-sectional view of a bumper assembly.

FIG. 4 is a cross-sectional view of bumper assembly 12. Bumper assembly 12 includes bumper 16', top plate 18, bottom plate 20, lighting elements 22a', 22b', and 22c', control element 24 (shown in FIG. 1C), and power source 26. Bumper 16' includes barrel 28', top end 30, bottom end 32, and central bore 34. Barrel 28' includes recess 36' and through-holes 38. Top plate 18 includes cover 40 and compartment 42.

Bumper 16' is disposed between and attached to top plate 18 and bottom plate 20. Barrel 28' extends between top end 30' and bottom end 32'. Recess 36' extends around barrel 28', and lighting element 22a' is disposed within recess 36'. Recess 36' can house lighting element 22a' during operation, and can be sized to prevent lighting element 22a' from projecting beyond an outer surface of barrel 28'. As shown, bumper 16' can include a single recess 36' extending circumferentially around bumper 16'. It is understood, however, that bumper 16' can include any desired number of recesses and lighting elements. In some examples, bumper 16' does not include any recess 36', and lighting element 22a' is thus disposed on the outer surface of bumper 16'. Through-holes 38 extend through bumper 16' into recess 36'. Through-holes 38 can provide a pathway to connect power source 26 and lighting elements 22a'.

Lighting element 22a' extends around barrel 28' within recess 36'. As shown, lighting element 22a' can include an electroluminescent sheet or tape. Lighting element 22a' can also include a backing material, such as an adhesive, to secure lighting element 22a' to bumper 16'. While lighting element 22a' is shown disposed in recess 36', it is understood that lighting element 22a' can be attached to an outer surface of bumper 16'. Bumper 16' can also include a protective layer, such as protective layer 46 (shown in FIG. 2), covering bumper 16' and enclosing lighting element 22a'.

Top plate 18 is attached to top end 30' of bumper 16'. Lighting element 22b' is disposed on an exterior surface of top plate 18. As shown, lighting element 22b' can include an electroluminescent sheet or tape, such as an electroluminescent sheet or an LED tape, applied to the exterior surface of top plate 18. In some examples, lighting element 22b' includes a backing material, such as an adhesive, configured to retain lighting element 22b' in a desired location. Top plate 18 can also include a protective layer, such as protective layer 46 (shown in FIG. 2), covering top plate 18 and enclosing lighting element 22b'. Top plate 18 can also include through-holes, similar to through-holes 38, to provide a pathway between power source 26 and lighting element 22b'.

Bottom plate 20 is attached to bottom end 32' of bumper 16'. Lighting element 22c' is disposed on an exterior surface of bottom plate 20, and is configured to emit light in response to a current being applied to lighting element 22c'. Lighting element 22c' can be an electroluminescent sheet or tape, or an LED tape, applied to the exterior surface of bottom plate 20. In some examples, lighting element 22c' includes a backing material, such as an adhesive, configured to retain lighting element 22c' in a desired location. Bottom plate 20 can also include a protective layer, such as protective layer 46 (shown in FIG. 2), covering bottom plate 20 and enclosing lighting element 22c'. Bottom plate 20 can also include through-holes, similar to through-holes 38, to provide a pathway between power source 26 and lighting element 22c'.

Bumper assembly 12 provides significant advantages. Lighting element 22' being an electroluminescent sheet simplifies manufacturing and provides additional visual indication to bumper assembly 12. An electroluminescent sheet can be cut to a desired shape and applied to bumper assembly 12 in any suitable manner, such as with an adhesive backing. As such, the electroluminescent sheet can be easily applied to parts of bumper assembly 12 that have complex geometries and/or provide a difficult mounting surface for electroluminescent wires, such as a bottom surface of bottom plate 20, for example.

DISCUSSION OF POSSIBLE EMBODIMENTS

The following are non-exclusive descriptions of possible embodiments of the present invention.

A bumper assembly for a rescue hoist includes a bumper having a barrel extending between a top end and a bottom end, a first lighting element disposed on the bumper and configured to emit light in response to a current from a power source, and a top plate disposed on the top end, the top plate defining a compartment configured to house the power source.

The bumper assembly of the preceding paragraph can optionally include, additionally and/or alternatively, any one or more of the following features, configurations and/or additional components:

The bumper includes at least one recess extending around the bumper, the recess configured to house the lighting element.

The first lighting element comprises an electroluminescent wire disposed within the at least one recess.

The at least one recess extends helically around the bumper.

The at least one recess extends helically around the barrel.

A protective layer disposed on the bumper, wherein the first lighting element is disposed between the bumper and the protective layer.

The protective layer includes an overmolded encapsulation disposed on the bumper.

The protective layer includes a sheath removably disposed on the bumper.

A control element configured to control the supply of power to the first lighting element from the power source.

The control element includes a switch extending from the top plate, the switch being a contact switch configured to control the supply of power to the first lighting element based on the top plate contacting a hard stop.

The control element includes a sensor, the sensor being one of a photocell configured to control the supply of power to the first lighting element based on a level of ambient light and a proximity sensor configured to control the supply of power to the first lighting element based on a sensed distance between the top plate and an object.

A second lighting element disposed on the top plate.

The second lighting element includes an electroluminescent sheet.

The second lighting element includes an electroluminescent wire disposed in a second recess extending into the top plate.

A bottom plate disposed on the bottom end of the bumper, and a second lighting element disposed on the bottom plate.

The second lighting element comprises an electroluminescent sheet.

A hook assembly for a rescue hoist includes a bumper assembly and a hook. The bumper assembly includes a bumper having a barrel extending between a top end and a bottom end and a first recess extending helically around the barrel, a first lighting element disposed in the first recess, a top plate attached to the top end of the bumper and defining compartment, a bottom plate attached to the bottom end of the bumper, and a power source disposed within the compartment, the power source configured to provide power to the first lighting element. The hook extends from the bottom plate.

The hook assembly of the preceding paragraph can optionally include, additionally and/or alternatively, any one or more of the following features, configurations and/or additional components:

A second lighting element disposed on the top plate, and a third lighting element disposed on the bottom plate.

The top plate includes a second recess, the second lighting element disposed in the second recess, and the bottom plate includes a third recess, the third lighting element disposed in the third recess.

A protective layer disposed on the bumper and enclosing the first lighting element within the recess.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A bumper assembly for a rescue hoist, the bumper assembly comprising:
   a bumper having a barrel extending between a top end and a bottom end;
   a top plate disposed on the top end, the top plate defining a compartment configured to house a power source; and
   a first lighting element disposed on the bumper and configured to emit light in response to a current from the power source;
   wherein the bumper includes at least one recess extending into an outer surface of the bumper, the at least one recess configured to house the first lighting element.

2. The bumper assembly of claim 1, wherein the first lighting element comprises an electroluminescent wire disposed within the at least one recess.

3. The bumper assembly of claim 1, wherein the at least one recess extends helically around the bumper.

4. The bumper assembly of claim 3, wherein the at least one recess extends helically around the barrel.

5. The bumper assembly of claim 1, further comprising a protective layer disposed on the bumper, wherein the first lighting element is disposed between the bumper and the protective layer.

6. The bumper assembly of claim 5, wherein the protective layer comprises an overmolded encapsulation disposed on the bumper.

7. The bumper assembly of claim 5, wherein the protective layer comprises a sheath removably disposed on the bumper.

8. The bumper assembly of claim 1, further comprising:
   a control element configured to control the supply of power to the first lighting element from the power source.

9. The bumper assembly of claim 8, wherein the control element comprises a contact switch extending from the top plate and configured to control the supply of power to the first lighting element based on the top plate being in contact with an object.

10. The bumper assembly of claim 8, wherein the control element comprises a photocell configured to control the supply of power to the first lighting element based on a level of ambient light and a proximity sensor configured to control the supply of power to the first lighting element based on a sensed distance between the top plate and an object.

11. The bumper assembly of claim 1, further comprising:
    a second lighting element disposed on the top plate.

12. The bumper assembly of claim 11, wherein the second lighting element comprises an electroluminescent sheet.

13. The bumper of claim 1, further comprising:
    a bottom plate disposed on the bottom end of the bumper; and
    a second lighting element disposed on the bottom plate.

14. The bumper assembly of claim 13, wherein the second lighting element comprises an electroluminescent sheet.

15. A bumper assembly for a rescue hoist, the bumper assembly comprising:
    a bumper having a barrel extending between a top end and a bottom end;
    a top plate disposed on the top end, the top plate defining a compartment configured to house a power source;
    a first lighting element disposed on the bumper and configured to emit light in response to a current from the power source; and
    a second lighting element disposed on the top plate wherein the second lighting element comprises an electroluminescent wire disposed in a recess extending into the top plate.

16. A hook assembly for a rescue hoist, the hook assembly comprising:
    a bumper assembly comprising:
       a bumper comprising:
          a barrel extending between a top end and a bottom end; and
          a first recess extending helically around the barrel;
       a first lighting element disposed in the first recess;
       a top plate attached to the top end of the bumper, the top plate defining a compartment;
       a bottom plate attached to the bottom end of the bumper; and
       a power source disposed within the compartment, the power source configured to provide power to the first lighting element; and
    a hook extending from the bottom plate.

17. The hook assembly of claim 16, further comprising:
    a second lighting element disposed on the top plate; and
    a third lighting element disposed on the bottom plate.

18. The hook assembly of claim 17, wherein:
    the top plate includes a second recess, the second lighting element disposed in the second recess; and
    the bottom plate includes a third recess, the third lighting element disposed in the third recess.

19. The hook assembly of claim 18, further comprising:
    a protective layer disposed on the bumper and enclosing the first lighting element within the recess.

* * * * *